United States Patent
Lokman et al.

(10) Patent No.: US 10,205,706 B2
(45) Date of Patent: Feb. 12, 2019

(54) SYSTEM AND METHOD FOR PROGRAMMABLE NETWORK BASED ENCRYPTION IN SOFTWARE DEFINED NETWORKS

(71) Applicant: ARGELA YAZILIM VE BILISIM TEKNOLOJILERI SAN. VE TIC. A.S., Istanbul (TR)

(72) Inventors: Erhan Lokman, Istanbul (TR); Sinan Tatlicioglu, Istanbul (TR); Seyhan Civanlar, Istanbul (TR); Burak Gorkemli, Istanbul (TR); Metin Balci, Istanbul (TR); Bulent Kaytaz, Istanbul (TR)

(73) Assignee: ARGELA YAZILIM VE BILISIM TEKNOLOJILERI SAN. VE TIC. A.S. (TR)

( * ) Notice: Subject to any disclaimer, the term of this patent is extended or adjusted under 35 U.S.C. 154(b) by 188 days.

(21) Appl. No.: 15/152,538

(22) Filed: May 11, 2016

(65) Prior Publication Data
US 2017/0331794 A1    Nov. 16, 2017

(51) Int. Cl.
*H04L 29/00* (2006.01)
*H04L 29/06* (2006.01)
*H04L 12/707* (2013.01)

(52) U.S. Cl.
CPC ...... *H04L 63/0428* (2013.01); *H04L 63/0272* (2013.01); *H04L 63/0471* (2013.01); *H04L 63/164* (2013.01); *H04L 45/24* (2013.01)

(58) Field of Classification Search
CPC ............. H04L 63/0428; H04L 63/0471; H04L 63/0272

(Continued)

(56) References Cited

U.S. PATENT DOCUMENTS

| 7,895,431 B2 * | 2/2011 | Bouchard | H04L 12/56 370/395.4 |
| 2010/0220732 A1 * | 9/2010 | Hussain | H04L 45/00 370/395.53 |

FOREIGN PATENT DOCUMENTS

WO    WO 2012155429 A1 *  11/2012 ......... H04L 41/0604

OTHER PUBLICATIONS

Townsley et al., "Layer Two Tunneling Protocol 'L2TP'," Network Working Group, RFC 2661, Aug. 1999, 74 pgs.
(Continued)

*Primary Examiner* — Jeffrey C Pwu
*Assistant Examiner* — Michael D Anderson
(74) *Attorney, Agent, or Firm* — IP Authority, LLC; Ramraj Soundararajan

(57) ABSTRACT

Sensitive data is sent through insecure network regions across different software defined networks (SDNs) over an encrypted path without requiring encryption applications at the source or destination hosts. One or more special-purpose encryptors are strategically placed within each SDN, which can act as an encryptor or decryptor, of both the data packet content and the header. Using the controller and a special encryption service application, the encrypted IP packets are forwarded from an encryptor, closest to the source, towards a decryptor, closest to the destination, utilizing a tagging method. Each encryptor has a static and globally unique tag. Each controller advertises to other controllers its encryptor information: IP of the encryptor, the IP block of the users the encryptor is responsible for and the unique encryptor tag(s). Each forwarder along the flow path is instructed by its respective controller how to forward packets towards the destination according to the tag.

22 Claims, 8 Drawing Sheets

(58) Field of Classification Search
USPC .......................................................... 713/160
See application file for complete search history.

(56) References Cited

OTHER PUBLICATIONS

Rosen et al., "Multiprotocol Label Switching Architecture," Network Working Group, RFC 3031, Jan. 2001, 57 pgs.
"Software-Defined Networking: The New Norm for Networks," ONF Open Networking Foundation, ONF White Paper, Apr. 13, 2012, 12 pgs.
McKeown et al., "OpenFlow: Enabling Innovation in Campus Networks," ACM SIGCOMM Computer Communication Review, New York NY, USA, V38, N2, Apr. 2008, pp. 69-74.
"OpenFlow Switch Specification (Version 1.5.1 (Protocol version 0x06))," ONF Open Networking Foundation, ONF TS-025, Mar. 26, 2015, 283 pgs.
Kent et al., "Security Architecture for the Internet Protocol," Network Working Group, RFC 4301, Dec. 2005, 86 pgs.
Jeong et al., "Requirements for Security Services based on Software-Defined Networking," Network Working Group, Internet-Draft: draft-jeong-i2nsf-sdn-security-services-01, Mar. 23, 2015, 12 pgs.

\* cited by examiner

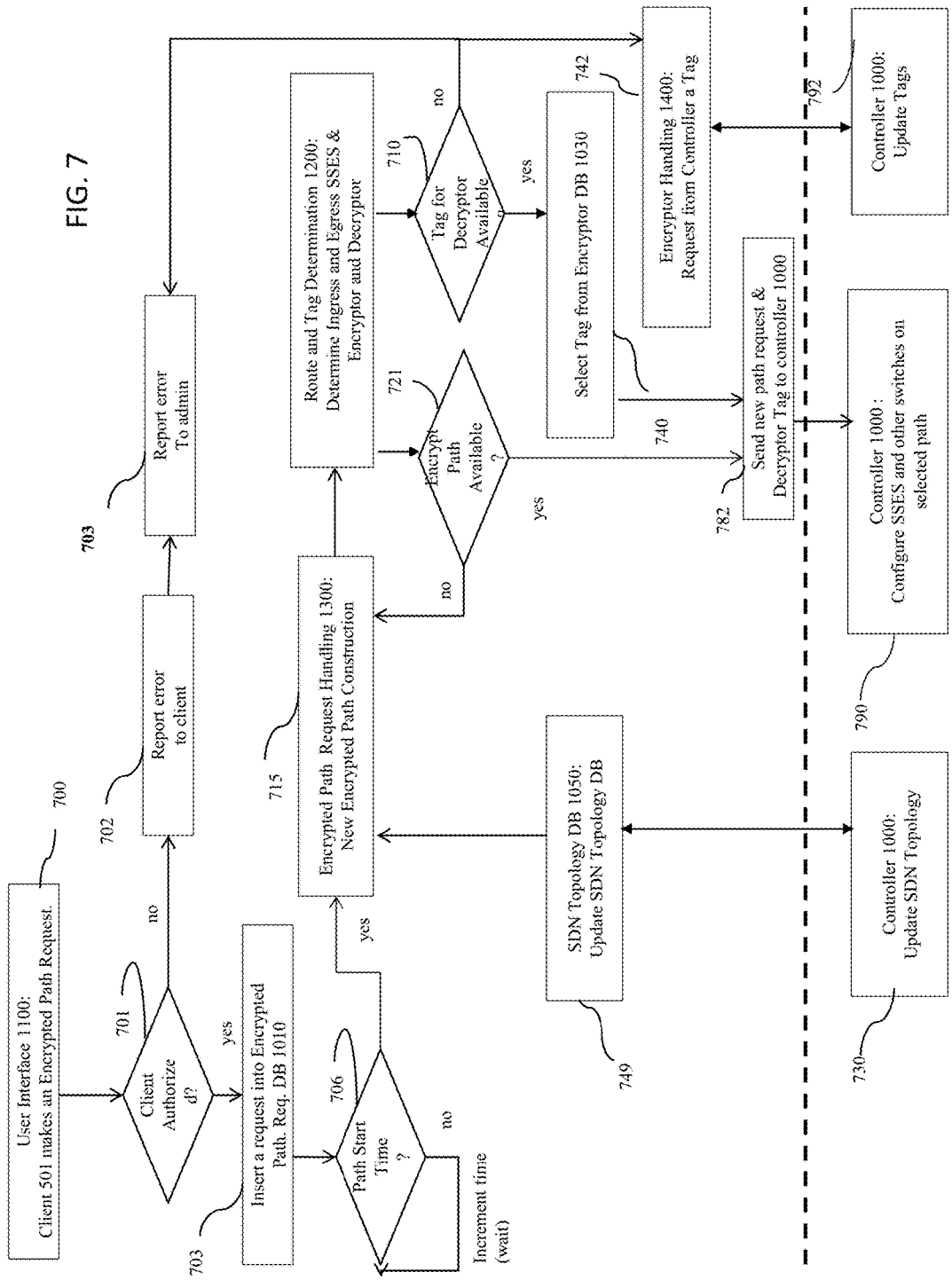

SYSTEM AND METHOD FOR PROGRAMMABLE NETWORK BASED ENCRYPTION IN SOFTWARE DEFINED NETWORKS

BACKGROUND OF THE INVENTION

Field of Invention

The present invention relates generally to data communications and more specifically it relates to the secure delivery of sensitive data in a software defined network (SDN) while passing through network regions that potentially carry security risks.

Discussion of Related Art

Any discussion of the prior art throughout the specification should in no way be considered as an admission that such prior art is widely known or forms part of common general knowledge in the field.

In a computer network data packets sent toward a destination are relayed between switches, some of which may have been compromised. As a result, a need arises for secure communications over insecure network regions. An efficient way to send data with the desired privacy is encryption between the source and destination. As long as the encryption key is kept safe, the data will be safe. However, solely encrypting the content of the data does not guarantee absolute privacy since the attacker can infer communicating end points' identity, and learn about the frequency and volume of the communications. In such a case, it is imperative to encrypt not only the data content but also the source and destination IP addresses. The entire IP packet (including the IP header) can be encrypted close to the source, and sent to another trustworthy encryptor close to the destination, where it can be decrypted, and delivered safely to the destination. Doing so, data packets travel through insecure network regions in a completely private manner. However, performing all these tasks in real-time and executing without manual intervention is not possible in the current Internet.

Today's Virtual Private Networks (VPNs) [see paper RFC 2661, Layer Two Tunneling Protocol 'L2TP'.] use the above-mentioned logic to provide private communications on the global Internet. Using the VPN technology, a company can interconnect its sites at different locations over an insecure Internet infrastructure. To do so, all packets in a site are sent through a secure 'middle-box' at the edge of the network, which is essentially a firewall where the source and destination addresses are checked. The eligible packets are encrypted and then forwarded to the firewall of the destination site in a tunnel (just like a private line). In turn, the firewall at the destination site decrypts the incoming packets, recovers the original receiver address and delivers them to their right host. IPSec (see paper RFC 4301, Security Architecture for IPSec) is the most known and used prior art technique to encrypt packets.

In a VPN, source and destination addresses are manually configured before any communications start. Furthermore, usually all communications between a sender and receiver are treated exactly the same manner regardless of whether they carry any sensitive data or not, and the routed path between the VPN boxes is fixed.

A variant of VPN is a Multi-protocol Label Switching (MPLS) based VPN [see paper RFC 3031, MPLS Architecture], which has gained wide popularity to establish secure tunnels within multi-protocol networks. MPLS allows packets to be forwarded at layer-2 (the switching layer) rather than having to be passed up to layer-3 (the routing layer). It avoids time-consuming next hop address table lookup by forwarding based on a simple tag inserted between layer-2 and -3 packet headers.

In MPLS, each packet gets labeled on the entry point into the network at a label edge router (LER). All subsequent routers perform packet forwarding based only on the label—they never look as far as layer-3 header information. Finally, the egress LER removes the label and forwards the original packet toward its final destination. MPLS VPNs are statically established. MPLS routers distribute tags using Label Distribution Protocol (LDP), which is rather complex.

SDN [see ONF white paper entitled, "Software Defined Networking: The New Norm for Networks," Apr. 13, 2012, 12 pgs.] is a new approach for networking that allows decoupling of control and data planes. In summary, decisions about traffic routing are performed at the control plane, while traffic forwarding is performed at the data plane according to the rules determined by the control plane. An SDN controller is the software where control plane decisions such as routing are made. It may reside in a single computer or may be distributed to many computers. There may be one or more controllers per SDN. The controllers of the same or different SDNs exchange control information about their respective networks (just like BGP does). SDN applications are written in Or on the controller, which enable different ways of management of data plane routes based on specific operator service application needs such as the one in this invention.

The controller is a logically centralized entity in charge of (i) translating the requirements from an SDN application down to the data path in the form of 'forwarding instructions'; and (ii) providing an SDN application a view of the network (which may include complete or partial view of network topology, statistics and events). The controller is mainly comprised of a 'control logic', a 'control to data plane interface' to control the data plane, and an 'API' for applications to interact with the controller, and a 'controller to controller interface' to allow interaction across controllers.

The SDN data plane is where forwarding and packet processing are performed. However, no routing function is executed within the data plane. A data plane entity is a 'switch' (or forwarder), which contains one or more fast traffic forwarding engines. Each switch has an interface towards the SDN controller to receive forwarding instructions and to send measurements collected on the switch.

The SDN control to data plane is an interface [see paper to McKeown et al., entitled, "OpenFlow: Enabling innovation in Campus Networks," ACM Communications Review] that provides at least (i) a programmatic control of all forwarding operations; (ii) capabilities advertisement; (iii) statistics and event reporting. One such interface is Open-Flow [see OpenFlow Switch, Specification Version 1.5.1], defined by the Open Networking Foundation, ONF, which is often misunderstood to be equivalent to SDN, but other mechanisms/protocols could also fit into the concept. Therefore, this patent application is not reliant on the OpenFlow protocol or its current capabilities.

SDN security has recently gained significant momentum especially in the standards bodies [see paper Network Working Group, entitled, "Requirements for Security Services based on Software-Defined Networking draft-jeong-i2nsf-sdn-security-services-01]. However, solutions to many SDN security issues have not been figured out and implemented.

When MPLS is supported within an SDN, the controller decides on which tags to use along an LSP and distributes instructions to the forwarders along that LSP. Meaning, there is really no need to run a Label Distribution Protocol (LDP) within a single SDN. When there are several SDNs, however, along the LSP, then the controllers involved along the LSP have to collaborate to agree on labels. However, that collaboration does not have to be as complex as LDP designed for a highly distributed routing function of the current Internet. While LDP has to scale in the order of routers (e.g., thousands), SDN-MPLS tag distribution has to scale in the order of controllers (e.g., tens).

Embodiments of the present invention are an improvement over prior art systems and methods.

SUMMARY OF THE INVENTION

The purpose of the present invention is to deliver sensitive data to its final destination in a secure and anonymous way across many SDNs, by providing the following key attributes:
(i) Exploiting network-based encryptors (as opposed to host-based);
(ii) Encrypting both the packet content and header before sending across the network to obfuscate the data entirely, i.e., the content as well as the communicating end points' identities;
(iii) Forwarding different encrypted data flows, between the same encryptor and decryptor pair, using a plurality of routes to meet flow-specific service level agreements (SLA);
(iv) Utilizing the centralized control and dynamic network resource coordination capabilities of the controller to set-up and modify routes in real-time;
(v) Forwarding encrypted data flows without needing to perform packet header lookup (given the header is encrypted) by using a unique tag associated with each encryptor; and
(vi) Distributing the encryptors' unique tags) across SDN controllers across via the 'controller to controller' interface.

Encryption can be performed based on source and/or destination identity or location, time of the day, or other properties of the communications. It can be performed between data center sites or disparate corporate locations. Between the same source and destination pair, some selected data can be sent privately at a particular time, while another data can be sent without using an encrypted path. Unlike static VPN technologies, any specified flow between a source and destination pair can be encrypted in real-time with this method. Since the conditions for encryption path set-up are controlled by the security application that runs on the SDN controller, the invention brings great dynamicity compared to legacy VPN technologies. The current 'control to data plane' protocols (such as OpenFlow [see paper OpenFlow Switch Specification Version 1.5.1]) can be used to set up all encryption paths without needing much extension.

In summary, the new data communication method proposed in the present invention departs from the conventional concepts and designs of the prior art, and in doing so provides a more dynamic way for secure delivery of the selected critical data between a source and destination over an encrypted path under the control of the SDN controller. This approach does not require users to employ a special encryption application on the end-hosts or to administer any VPN middle boxes. Network-based components operated by the SDN operator are used leveraging the SDN controller's unique capability of having a global view of the network resources, and its routing ability to instantly setup and tear down paths. A tag is associated with every encryptor in the network, allowing packet forwarding based on a tag value.

Key Terms

Encryptor: The network-based (hardware and software) device that is located in the SDN network, encrypting packets, and reciprocally decrypting encrypted packets. Whenever we use the term decryptor, we mean encryptor in decrypting mode.

SSES, Security Specific Edge Switch: The switch that is directly attached to the encryptor via a layer-2 connection.
  Ingress SSES: Attached to an Encryptor, which operates at the encrypting mode, for a specific data flow.
  Egress SSES: Attached to an Encryptor, which operates at the decrypting mode, for a specific data flow.

Tag: The tag is a label typically inserted between the layer-2 and layer-3 packet headers allowing packets to be identified and routed based on the tag value. Tag can be in an MPLS label format.

ENSERA: An ENcryption SERvice Application, where secure path requests are entered, users are authenticated, path requests are authorized and paths are determined. It also manages the ciphering agreements between an Encryptor and a Decryptor. It ensures end to end encryption path set up between different SDHs. It is a special security application of an SDN controller according to an aspect of this invention.

In one embodiment, the present invention discloses a method, as implemented in a first switch, to setup an encrypted path between a source and destination comprising: (a) receiving, at the first switch, one or more data packets from the source intended for destination, the first switch directly attached to a first encryptor; (b) tagging each data packet received in (a) with a unique tag corresponding to a second encryptor associated with the destination; (c) forwarding tagged data packets from (b) to the first encryptor wherein, for each packet, the first encryptor: (c1) removes the unique tag in each packet, (c2) encrypts layer-3 packet content and header, (c3) retags encrypted packets of (c2) with the unique tag corresponding to the second encryptor associated with the destination, and (c4) returns retagged, encrypted, packets of (c3) back to the first switch; (d) receiving retagged, encrypted, packets returned in (c3) and forwarding the same to a second switch directly attached to the second encryptor, wherein the second decryptor decrypts the forwarded retagged, encrypted, packets.

In another embodiment, the present invention provides an Encryption Service Application (ENSERA) for setting up air encrypted data path between a data source and destination using a unique tag and for sending associated forwarding rules to software defined network (SDN) switches along the data path, the ENSERA comprising: (a) an encrypted path request database storing received encrypted path requests; (b) an encryptor database storing information about encryptors in a local SDN and encryptors in a remote SDN, where the information comprises any of, or a combination of, the following: a default encryptor associated with the local SDN, a default encryptor associated with the remote SDN, unique tags associated with one or more encryptors in the local SDN, unique tags associated with one or more encryptors in the remote SDN, geographic location of encryptors in the local SDN, geographic location of encryptors in the remote SDN, IP address of encryptors in the local SDN, IP address of encryptors in the remote SDN, IP address prefixes supported in encryptors in the local SDN, IP address prefixes supported in encryptors in the remote SDN, cipher keys associated with encryptors in the local SDN, or cipher keys associated with encryptors in the remote SDN; (c) an encrypted path database comprising information on live encrypted paths; (d) an application which determines a route associated with an encrypted path and determines an associated unique tag for forwarding, wherein an interface to the ENSERA sends and receives information on flow paths, network topology and unique tags.

In yet another embodiment, the present invention provides an article of manufacture comprising non-transitory computer storage medium storing computer readable program code which, when executed by a computer, implements a computer-based method, as implemented in a first switch, to setup an encrypted path between a source and destination comprising: (a) computer readable program code receiving, at the first switch, one or more data packets from the source intended for destination; the first switch directly attached to a first encryptor; (b) computer readable program code tagging each data packet received in (a) with a unique tag corresponding to a second encryptor associated with the destination; (c) computer readable program code forwarding tagged data packets from (b) to the first encryptor wherein, for each packet, the first encryptor: (c1) removes the unique tag in each packet, (c2) encrypts layer-3 packet content and header, (c3) retags encrypted packets of (c2) with the unique tag corresponding to the second encryptor associated with the destination; and (c4) returns retagged, encrypted, packets of (c3) back to the first switch; (d) computer readable program code receiving retagged, encrypted, packets returned in (c3) and forwarding the same to a second switch directly attached to the second encryptor, wherein the second decryptor decrypts the forwarded retagged, encrypted, packets.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 7 illustrates a flow chart of providing an encrypted path across an SDN according to an aspect of this invention.

DESCRIPTION OF THE PREFERRED EMBODIMENTS

Figure 1:
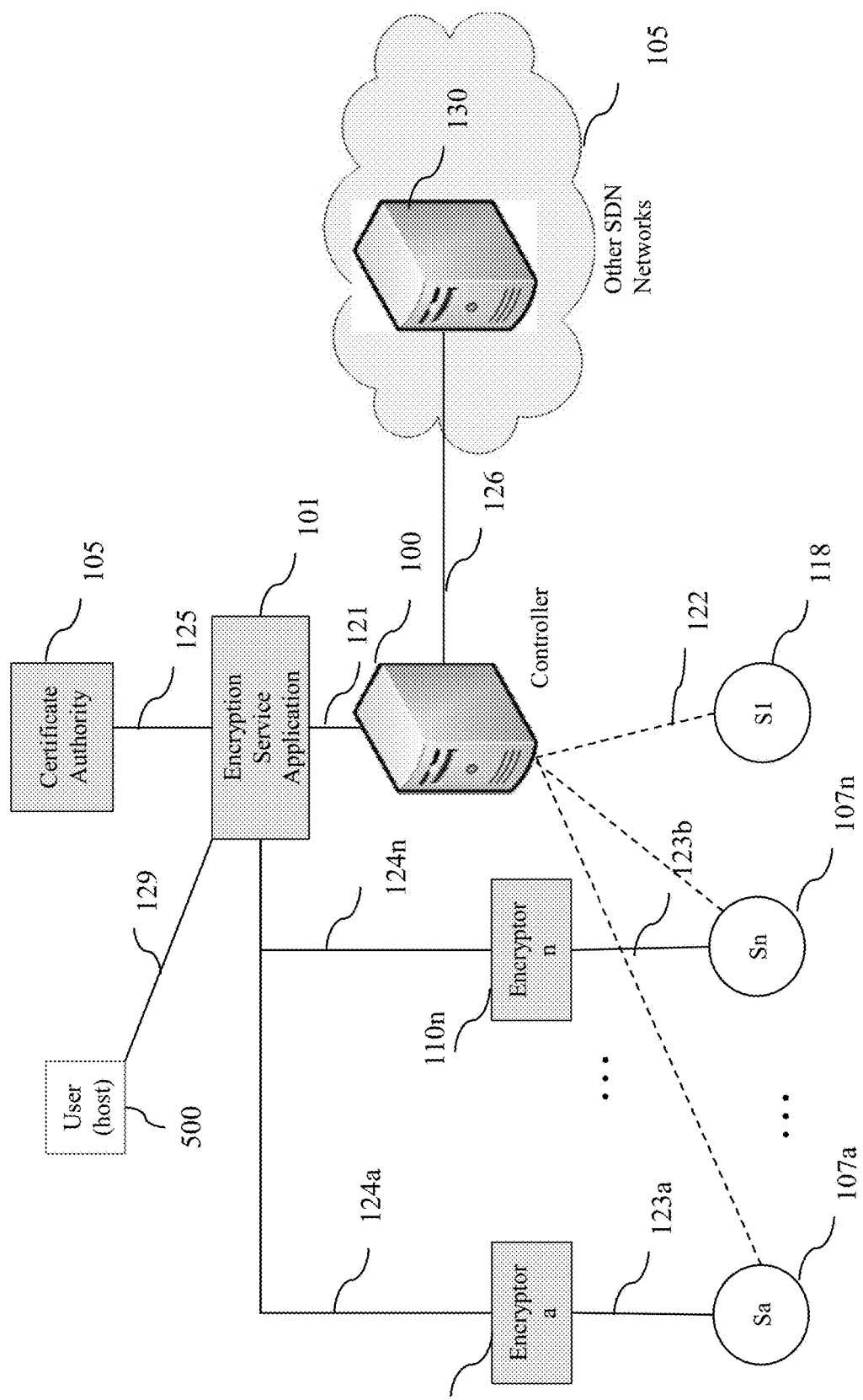
FIG. 1 illustrates the key systems and interfaces used in this invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The invention utilizes the idea of encrypting data packets before sending them over insecure network regions and decrypting them before delivering to their final destination, as in the VPN technology. However, substantially differing from VPN, this invention allows the SDN controller to (i) set up an encrypted path across an insecure network segment between source and destination pairs in real-time; (ii) treat different flows between each source and destination pair with different security policies (e.g., based on time-of-day, application type or location); (iii) use different routes for different types of encrypted flows.

The encryptor does not have to be placed at the exit and entrance points of the network. It can be placed anywhere in the network. An encryptor can simultaneously handle flows of many different source-destination pairs. The packets that need encryption (or decryption) are routed towards the encryptor via the switches according to the instructions sent by the controller.

Because encrypted data packets not only have their content, but also their header information encrypted, they lose their route-ability in the network using standard forwarding methods that use destination IP address at packet header for lookups. Thus, once the encryptor encrypts the entire packet, we need to encapsulate each encrypted packet with additional information (e.g., an extra header or a simple tag) to recognize and properly forward it.

Encryptor-Tag

This tag is essentially an identifier of an encryptor, and just like an IP address, it is unique and has a global meaning. The controller administratively determines an unused encryptor tag for each new encryptor in its network (manually or using an automatic tag selection algorithm), and advertises to all other controllers using the 'controller to controller interface', for example, using XML.

The ingress SSES knows that the encrypted packets should be redirected to the decryptor, therefore it inserts the tag of the decryptor (closest to the destination) before sending packets towards the encryptor. The encryptor encrypts the content and header of data packets, and thereafter, re-inserts this tag so that ingress SSES can forward the encrypted packet towards the decryptor. Note that, if there are multiple sources originating traffic (to be encrypted) towards the same decryptor, the encrypted flows corresponding to these multiple sources carry the same tag, which does not create any problems. Using the tag as opposed to a layer-3 address allows much faster forwarding.

During the process of tagging a new encryptor, if the chosen tag, by chance, is identical to the choice of another controller for its new encryptor, yet another tag must be chosen and advertised.

Multiple tags can be associated with an encryptor, each tag being associated with an SLA level. A database containing the tags of all encryptors is kept in ENSERA and/or each controller. When tags are advertised, controller will need to advertise all tags associated with an encryptor, each tag with an associated SLA (say best effort, better than best effort and expedited forwarding). The expressions for different SLA levels must be agreed beforehand between controllers.

Just to summarize the sequence of tagging: The controller provides the encryptor-tag along with the corresponding forwarding instructions the ingress security specific edge switch (SSES) and to all other (intermediate) switches on the path's route in that SDN. The switches along the route of encrypted data packets in all SDN's, solely route based on the value of the encryptor-tag of the decryptor until they reach the egress SSES. When packets traverse across SDN boundaries, each new controller along the way recognizes the tag and forwards packets towards the last SDN in which the decryptor is located.

As an exemplary a two-SDN scenario is considered, where SDNa is where the source is located and SDNb is where the destination is located. The role of each type of switch is outlined as follows:

Ingress SSES:
  Insert into packets the encryptor-tag of the decryptor, Te, and forward the packet towards the encryptor;
  Forward tagged packets received from the encryptor towards the next hop intermediate switch.
Intermediate Switch: forward packets to the next hop switch using table lookup according to Te, until the last switch in SDNa.
SDNb:
First Switch: forward packets according to Te to the next hop switch until the Egress SSES. Note that, if there were no instructions at the beginning, some packet-in messages will be sent directly to the controller first, which will send instructions to all switches along the path thereafter.
Egress SSES:
  Forward packets received from the last intermediate switch in SDNb with tag Te towards the decryptor.
  Remove tag Te from the original decrypted packets returning from the decrypt r, and forward packet to the next hop towards the destination using IP header information.

If there is a transit cloud (network segment) that does not support SDN, then at the last switch (most likely a gateway switch) towards that cloud, would need to remove the tag, insert a complete IP header in which the destination address is that of the decryptor. The first SDN switch (post likely a gateway switch) receiving the packet from the transit cloud determines that the packet is destined to the decryptor, remove the IP header and insert the tag. Optionally, the packet can be forwarded to the decryptor with the aforementioned IP header without needing the tag mechanism.

Key Systems

As illustrated in FIG. 1, there are several key players in the scheme of realizing the above concepts of this invention:
  Encryptor 110. Encrypts and/or decrypts data packets including content and header according to an aspect of this invention. It attaches to SSES 107a with typically a layer-2 connection.
  SDN Controller 100: Sends proper instructions to switches to forward data traffic. In a scenario with SDN networks, SDN controllers attach to one another to share information on their respective encryptors. SDN controller 100 is responsible for creating tags for each encrypted flow (as described above) and send them appropriate SSESs.
  Encryption Service Application (ENSERA) 101: An application that runs on the controller, and governs the aforementioned encryption application end-to-end. ENSERA coordinates the delivery of encrypted paths across many encryptors by collaborating with the SDN controllers. ENSERA also keeps a database for the encryptors of its own SDN and of other SDNs. It also manages ciphering agreements on the behalf of the encryptors under its 115 responsibility with the other encryptors in the destination SDNs.
  SSES 107: Operates according to instructions from the controller. It can insert and remove tags, and forward packets towards the encryptor or directly attached intermediate switches. The tags can be generated and managed by ENSERA, and provided to the switches via the controller. Alternatively, the controller may generate and maintain tags.
  Certificate Authority 105: As a trusted third party, it issues the digital certificates of different encryptors.
Control Interfaces
  Controller to Switch Interface 122 (e.g., OpenFlow)
  Controller to Controller interface 126 (an East-Westbound interface specific to sharing/advertising encryptor-tags and topology data, e.g., XML)
  Controller to ENSERA interface 121

Figure 2:
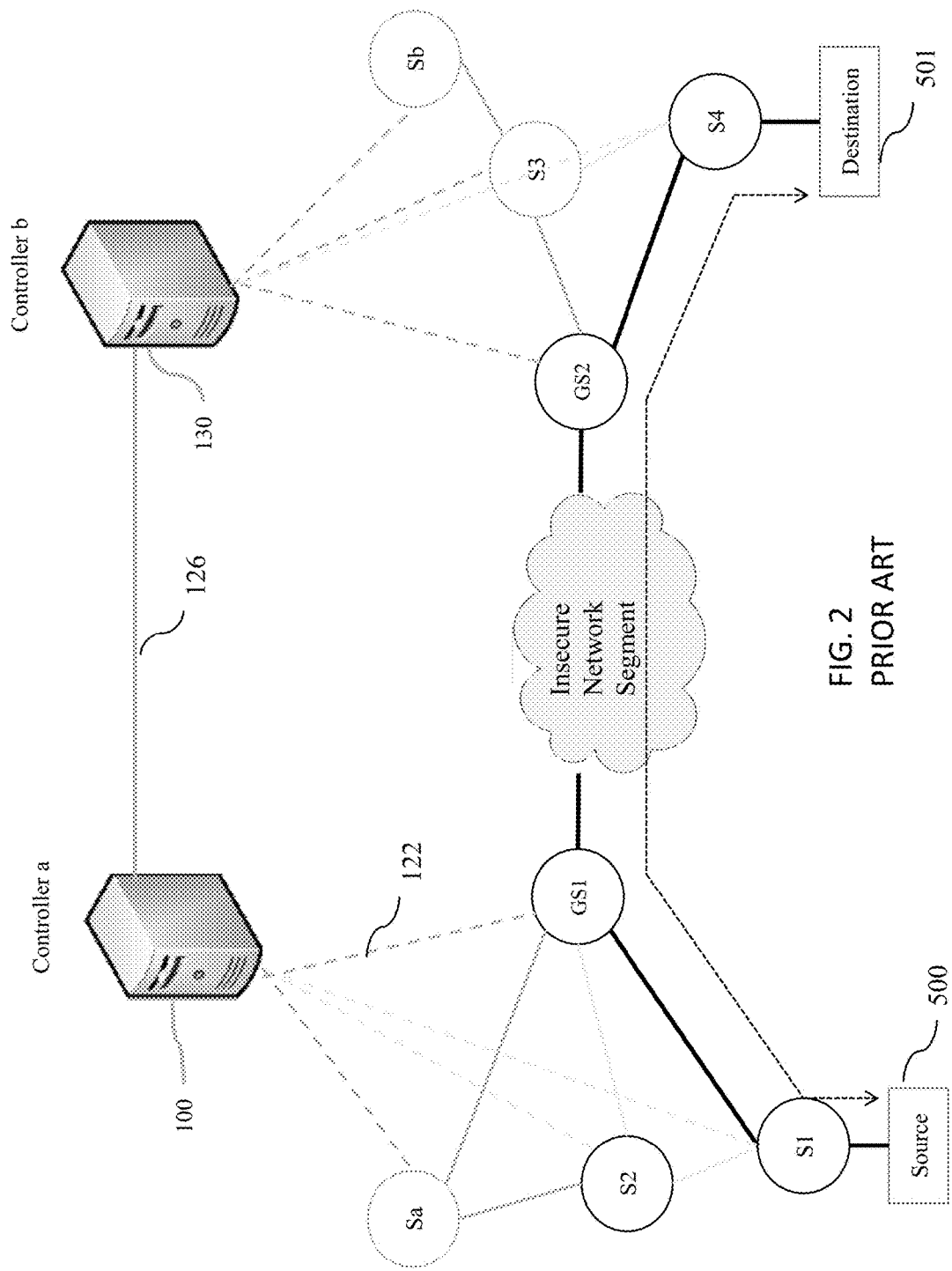
FIG. 2 illustrates the data flow path according to prior art.

In an SDN, packet forwarding is performed by switches upon instructions received from the controller. As illustrated in FIG. 2, when a flow originating from source 500 and destined to 501 arrives at switch S1, the switch checks to determine if there are any instructions as to which next hop switch to forward these packets. If there are no instructions, some packet-in messages are sent to controller 100 until controller 100 sends new instructions to switch S1. If there are forwarding instructions, however, S1 forwards packets accordingly, for example, towards GS1 (the gateway switch). Thereafter, the flow may traverse an insecure network segment to arrive at the gateway switch of the destination SDN network, which is illustrated as GS2. In turn, according to instructions from controller 130, GS2 forwards the packets to S4, and finally S4 forwards them to the final destination.

Figure 3:
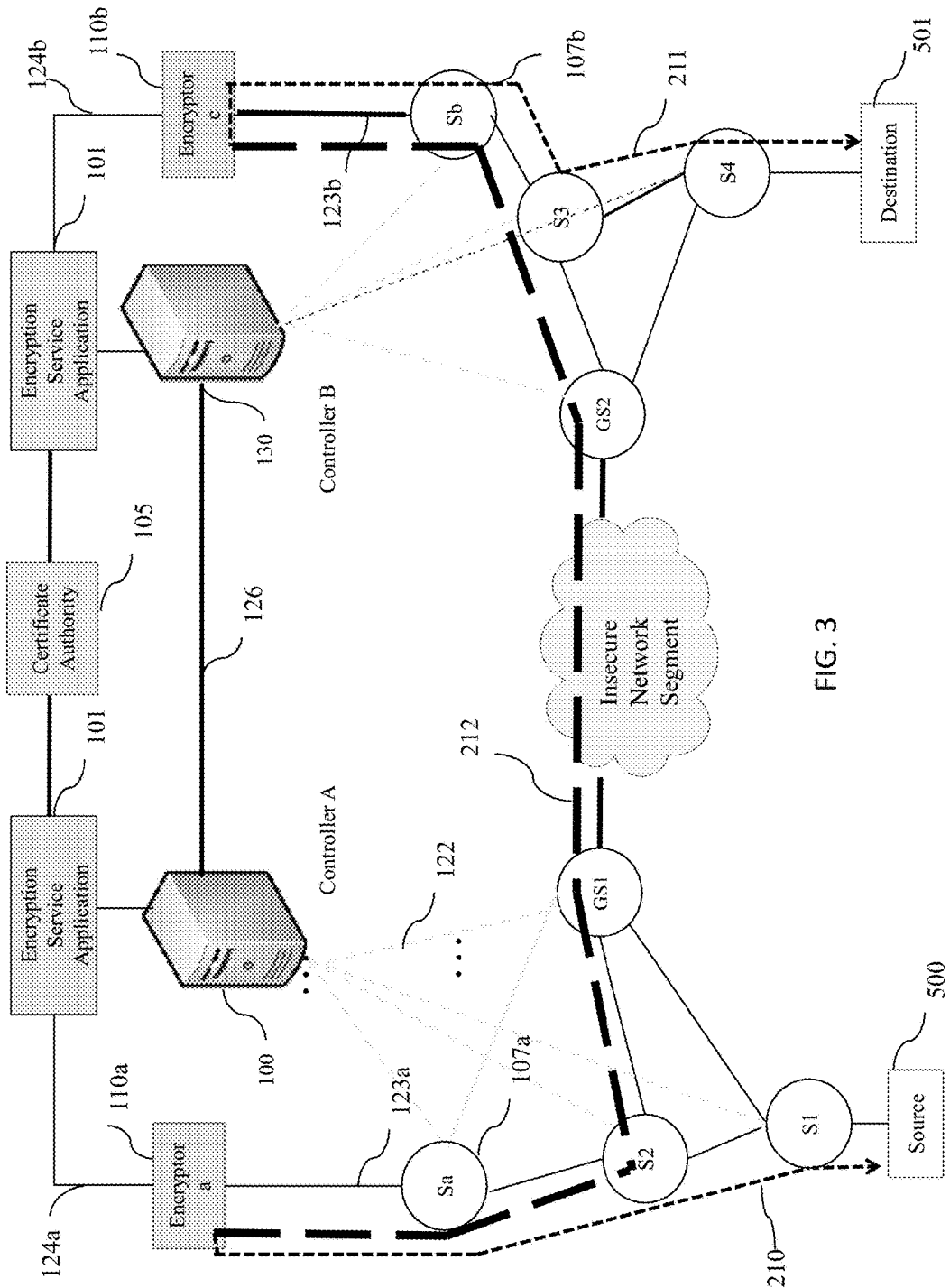
FIG. 3 illustrates the data flow path according to an aspect of this invention.

The new way of data forwarding according to this invention is illustrated in FIG. 3. The scenario of FIG. 2 is reconsidered to enable a simple encrypted path across the insecure network segment by deploying two encryptors, one in SDNa nearby source 500 and another in SDNb nearby destination 501.

The first switch, S1, checks its forwarding table to determine if there are any forwarding instructions for the incoming flow. If the switch cannot find a preinstalled rule, it asks controller 100 what to do via some packet-in messages. The controller calculates a forwarding path for the flow and instructs ingress switch S1 and other switches along the path how to forward packets toward the destination.

If there is an insecure network region on the path that cannot be avoided, and the type of service of the host (say, determined by the IP address of the host) requires a certain level of privacy specified in ENSERA, controller 100 decides to set up an encrypted path across the insecure region. In order to do so, controller 100, by setting new forwarding rules at the switches on the calculated path, ensures that all of the packets of the flow are first sent to encryptor 110a, closest to source 500, where the packets will be encrypted. FIG. 3 illustrates the resultant path established by the SDN controller. Note that the flow on the route between encryptors 110a and 110b solid dashed lined) is completely encrypted.

ENSERA can also provide a graphical user interface through which individual users or network administrators can make encryption requests. If ENSERA authenticates the requester and authorizes the request it instructs the controller for the encrypted path set up process.

Following the encrypted path, the packets are first directed toward Encryptor 110*a* (as opposed to destination 501). S1 forwards the packets to S2 (instead of GS1), and S2 forwards them toward Sa, the ingress SSES. Ingress SSES first tags each packet with the decryptor's tag, Te, and sends them to Encryptor 110, which in turn encrypts the data and returns it with the original tag Te to SSES. Note that controllers 100 and 130 have a database of all networked encryptors and their tags.

The look-up tables, according to Te, is sent to the switches by their respective controllers. The following route is followed: Sa->GS1->GS2->S3->Sb. Thereafter, Sb (egress SSES) forwards the packets to Encryptor 110*b* for decryption. Upon receiving decrypted packets in which the header of the original packet is now exposed, Sb->S3->S4 route is used to reach the final destination. Te is removed by the egress SSES before forwarding to final destination.

An encryptor determines that it is in an encrypting-mode, when the arriving packet has a tag for another encryptor other than its. On the contrary, an encryptor determines that it is in a decrypting-mode, when the arriving packet has its own tag.

Figure 4:
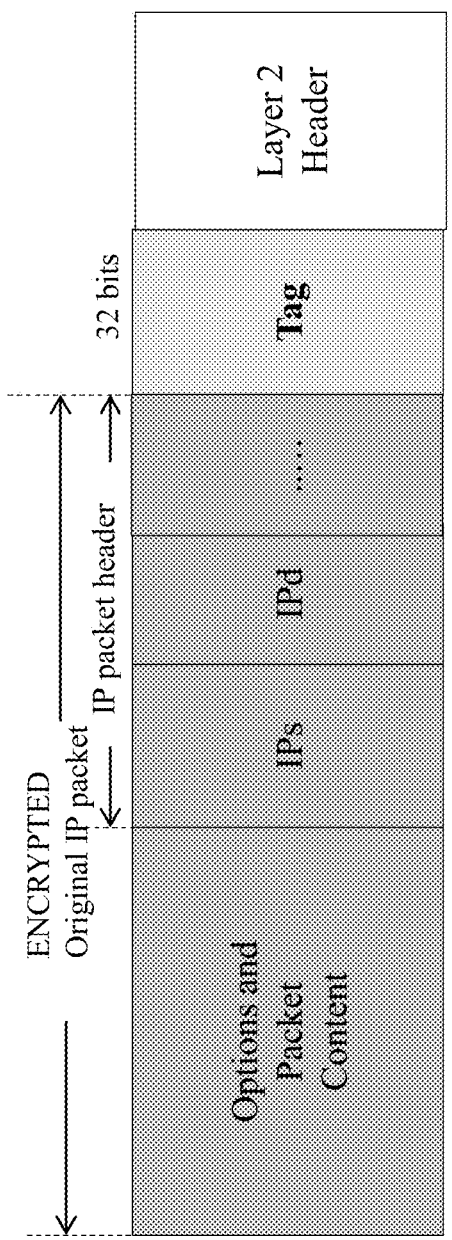
FIG. 4 illustrates an exemplary IP packet with the proposed tag.

A diagram on an IP packet according to an aspect of this invention is illustrated in FIG. 4. The original IP packet has (i) a packet header field, which contains the source and destination IP addresses along with other header information, and (ii) Options field and the packet content. This information is prior art. When Encryptor 110 encrypts the original IP packet, all these fields will be completely opaque (i.e., not visible). Given routing based on the destination address is no longer viable, a 'tag' is prepended to the encrypted original packet to in order to be able to route it.

The tag allows switches to receive specialized instructions for each encrypted data flow between an encryptor-decryptor pair. It also aids an ingress SSES to associate an outgoing flow towards the encryptor with the corresponding encrypted incoming flow from another encryptor (we are assuming several different flows are simultaneously sent to the encryptor by the same SSES). The aforementioned tag can be formatted as an MPLS label according to prior art, or another type of tag can be created for the special purpose of this patent. Although not emphasized, the IP address of the encryptor can be a feasible (although not optimal) candidate for a tag.

Because, the tag is at layer-2, there is no need to support a layer-3 protocol such as the IP protocol at the encryptor. When the ingress SSES sends a data packet to the Encryptor with a layer-2 header (e.g., an Ethernet header in which end points are identified by their MAC addresses) and the tag, the encryptor removes the layer-2 header and the tag, encrypts the content of the layer-2 packet (without requiring any specific layer-3 protocol), and sends it back to the SSES's MAC address by tagging the content with the received original tag. This operation requires the encryptor and SSES to be simply in the same layer-2 network.

Because the process of encrypting/decrypting, with prior art cipher keys and removing and inserting tags are simple and trivial enough tasks, we did not further describe the encryptor as a system of invention.

Figure 5A:
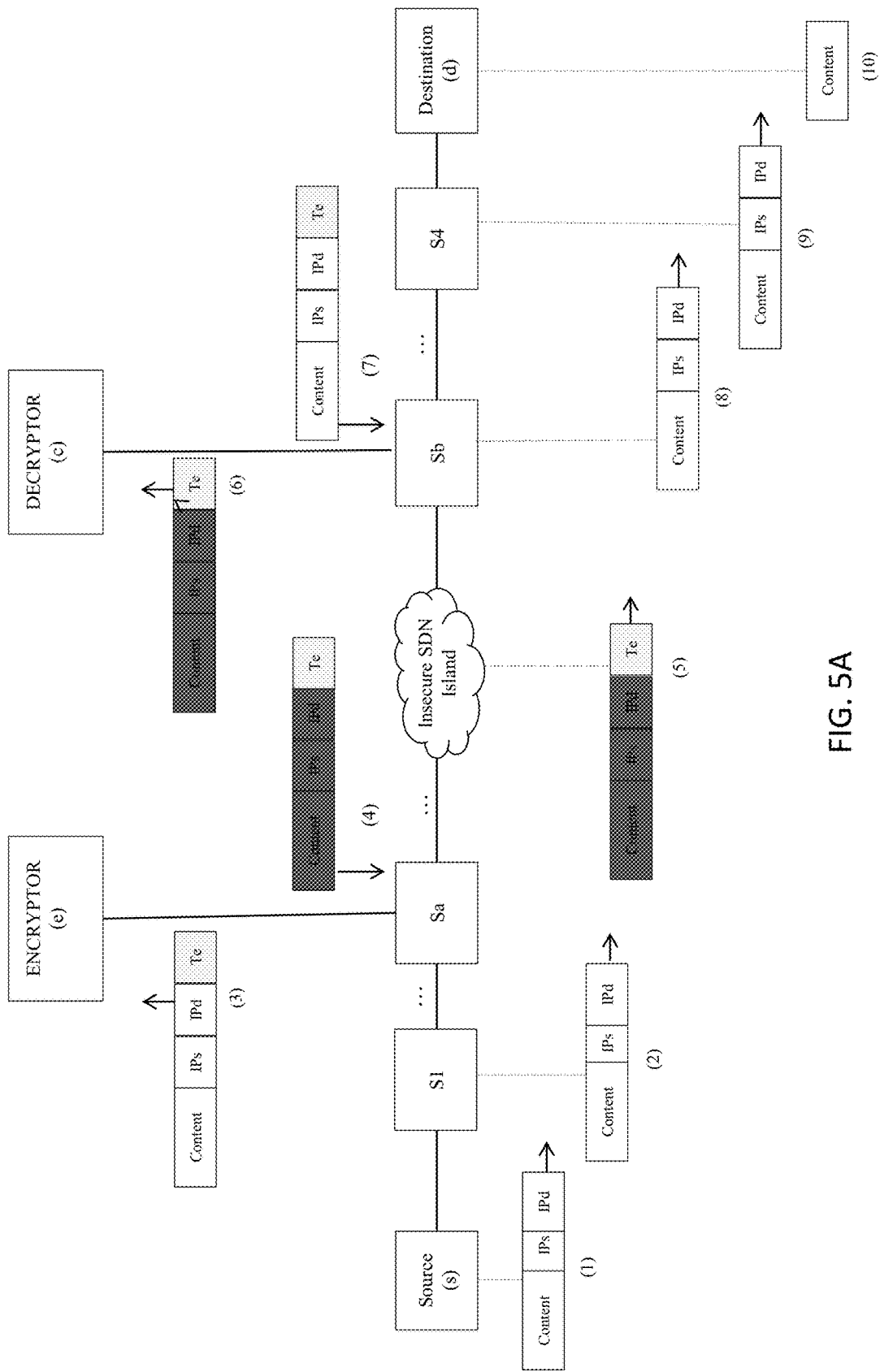
FIGS. 5A and 5B illustrate the transformation of IP packets along the route of the encrypted data flow.
Figure 5B:
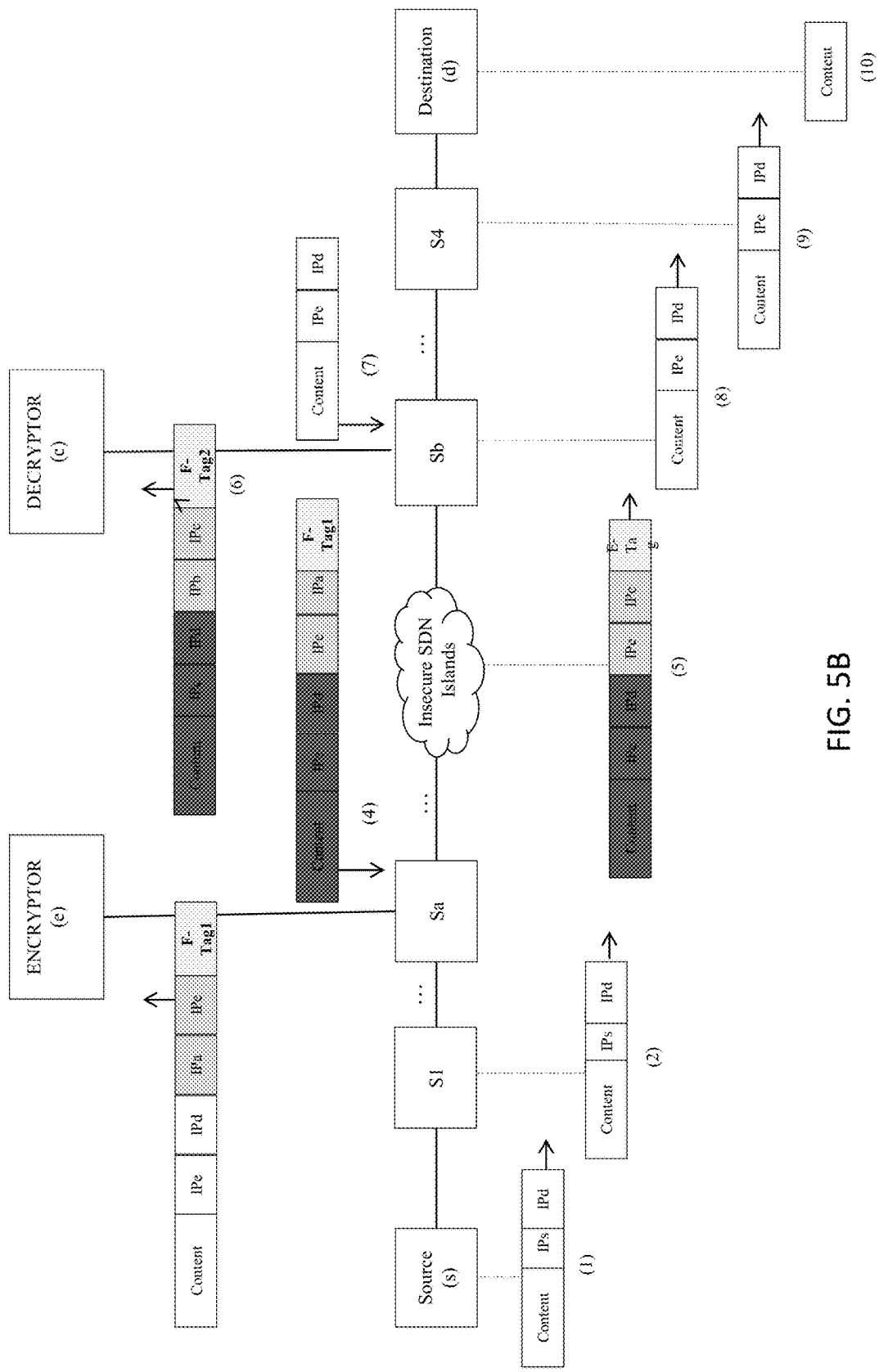

FIGS. 5A-B illustrates the changes in the packet header according to an aspect of this invention as they progress from the source toward the destination for clarity.

Although we only covered a uni-directional forwarding scheme (from a source towards a destination), if the flow is bi-directional, then generally speaking the same forwarding technique would apply in the reverse direction. In this scenario, the flow, originating from the destination host and destined to the source, must also be encrypted. The destination side decryptor takes the role of an encryptor and the encryptor at the source side takes the role of a decryptor. Thus, the reverse flow must be tagged with the source side encryptor's tag. Of course, the controller of the destination host must set up the forwarding rules for this flow. Plausibly, the controller of the source side sends a message to the controller of the destination side to indicate that a bi-directional encrypted flow will be established between the source and destination, in which case the destination's controller provides the forwarding instructions to all switches in the corresponding SDN. Although we have not detailed out in this patent application, ENSERA of the source and destination sides may directly share information about bi-directional flows, or alternatively via the respective controllers.

Note that the encrypted path essentially follows a 'tunnel' between Encryptor 110*a* and 110*b*, across several switches [110*a*-Sa-S2-GS1-GS2-S3-Sb-110*b*] as illustrated with dashed route in FIG. 3. An IPSec tunnel [see Network Working Group paper entitled, "Requirements for Security Services based on Software-Defined Networking draft-jeong-i2nsf-sdn-security-services-01] is prior art and well understood. When IPSec is used between encryptor 110*a* and 110*b*, various modes of IPSec operations and crypto options supported by standards must be supported and configured by both ends (MD-5, SHA-1, DES, AES, IKE, manual keys, AH mode, etc).

ENSERA System Description

Figure 6:
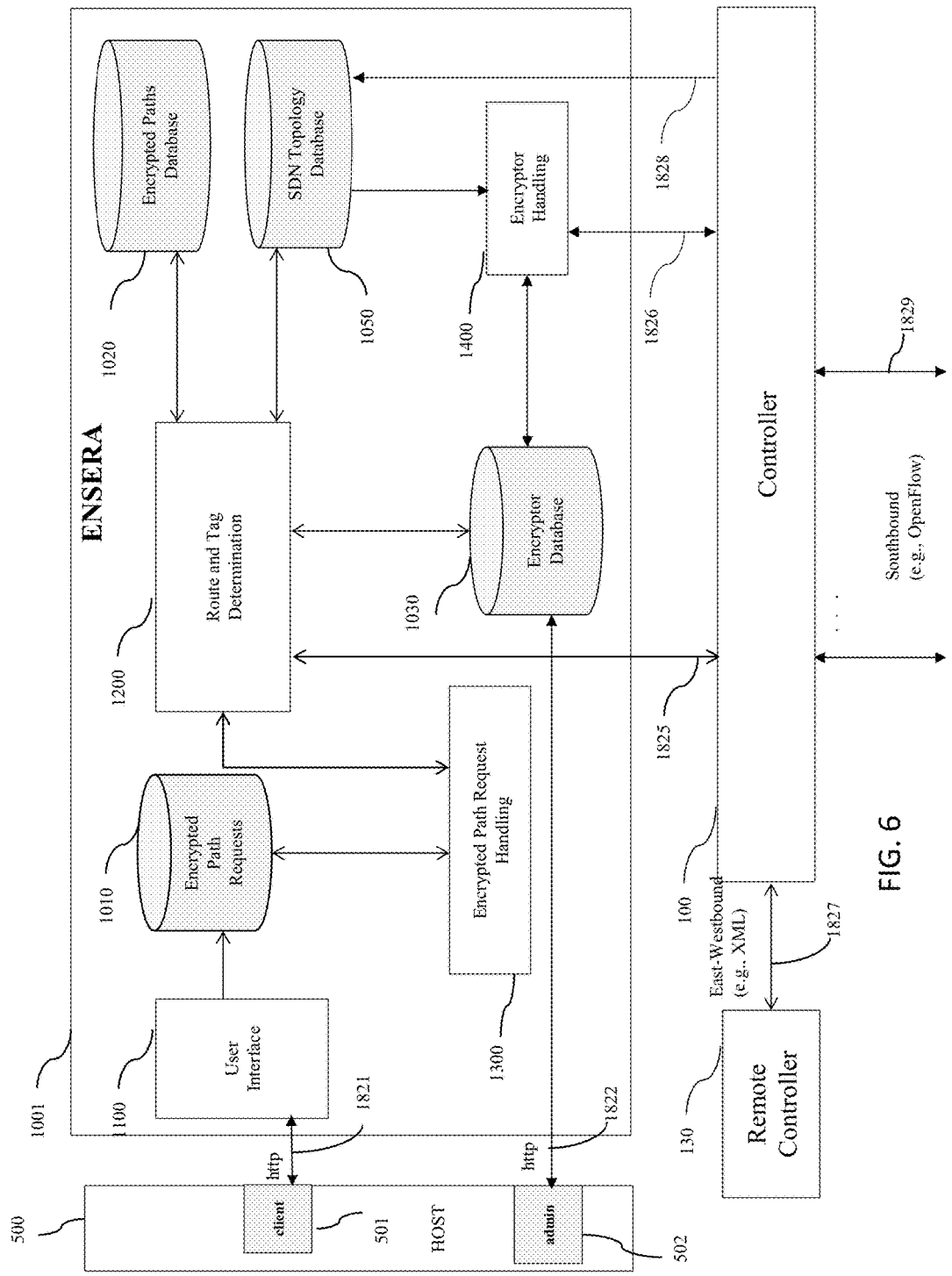
FIG. 6 illustrates an exemplary high-level system block diagram of the Encryption Service Application (ENSERA).

The "Encryption Service Application (ENSERA)" is a key component of the solution. It is the central point of coordination for the delivery of encrypted paths. As illustrated in FIG. 6, it is an application of the controller. It may run on a separate computer or on the same computer with the SDN controller, Some or all functions of ENSERA may also be executed in the controller depending on the implementation.

It is comprised of the following key components:
User Interface (UI) 1100. It can be reached via a web server, for example. User authentication and authorization is a function of the UI. It is used to enter and modify encrypted path requests by user 501, and/or system admin 502.
Various Databases:
  Encryptor Database 1030
    Local Encryptors Database: All encryptors in the local SDN including a default encryptor, containing encryptor tag(s), geographic location, IP address, IP address prefixes supported, and optionally cipher keys.
    Remote Encryptor Database: All encryptors in other SDNs including a default encryptor per SDN, containing encryptor tag(s), geographic location, IP address, IP address prefixes supported, and optionally cipher keys,
  Encrypted Path Requests Database 1010: All encrypted path requests made by users (path information included) are stored in this DB.
  Encrypted Paths Database 1020: All 'live' encrypted flow path information corresponding to path requests are stored here. It is kept current as paths are being activated and deactivated. It includes path's route and tag.

SDN Topology' Database 1050: This database is an active database of SDN interconnectivity including (both intra and inter domain), the prefixes supported by different SDNs and possibly their controllers' IP addresses. SDN Topology Database essentially provides a topology service to ENSERA. This database is kept current by Controller 100, Although for clarity purposes we showed this DB as an integral part of ENSERA, it may be located in the controller but reachable by ENSERA.

Various Interfaces:

Interface 1821-22 towards external users, to receive encrypted path requests, modify or administer path requests and the encryptor data. An interface towards the system administrator is included to enter and modify encryptors, keys, etc.

Interface 1825 to Controller 100, to send path and tag information for encrypted paths.

Interface 1826 to Controller 100, to send/receive information on other encryptors in the global network.

Interface 1828 to Controller 100, to receive updated SDN topology information Route and Tag determination module 1200: to determine the flow path and tag for an encrypted flow.

Encrypted path handling module 1300: to coordinate all activities to activate and deactivate an encrypted path (like a simple workflow engine).

Encryptor Handling Module 1400: to receive updated information from Controller 100 on encryptors in the local and global networks, to keep Encryptor Database 1030 current, and to associate encryptors with SDN topology using SDN Topology Database 1050.

In order to be able to dynamically forward encrypted packets towards other SDNs, ENSERA needs to receive information about the encryptors in other SDNs, its IP address, its tag(s) and the IP address blocks reserved to each encryptor to calculate the best flow paths. This information can be advertised across controllers of different SDNs using interface 1827, and then advertised by each local controller to its associated ENSERA. The information is kept current by periodic advertisements. The mapping of a group of IP blocks to a specific encryptor can also be based on geographic distance. One or more of the encryptors may be available for a group of IP addresses, but at least ogre default encryptor is needed per SDN.

Upon receiving a new encryptor advertisement from another SDN, ENSERA checks to find if there is a cipher agreement between the encryptors under its responsibility and the new encryptor. If there is not a cipher agreement ENSERA initiates the cipher agreements, thus ENSERA speeds up the path set up process when an encrypted path request arrives.

The user makes a secure connection to ENSERA through user interface 1100 to request an encrypted communications path towards an IP address (or a set of IP addresses/blocks). The host supplies the following information regarding the path:
a. Source IP address(es) or an IP address block
b. Destination IP address(es) or an IP address block
c. Type of service (VoiP, video, data, etc) (optional)
d. Protocol name and/or destination port number (optional)
e. Path's time-duration (start and stop times, for example)

ENSERA first authenticates and authorizes the user, and then opens up a user flow request registry in its database 1010 corresponding the encrypted communications path request. It checks to determine if a viable encryptor assignable to the destination host is found in Encryptor Database 1030. If such an encryptor is not found or the entry in the database is stale, an encryptor tag is requested by Encryptor Handling 1400 from local controller 100, which in turn con communicates (directly or indirectly) with destination controller 130 through the East-West interface 1827.

Once the path and tag are determined (assuming the cipher agreement between two encryptors is done beforehand), ENSERA sends instructions to controller 100 on interface 1825 to send flow instructions to switches on the route to activate the path in the local SDN. Meanwhile, it changes the state of the request in Encrypted Path Request Database 1010 as active. It may optionally inform the user when the encrypted path is ready.

If the encrypted path has multiple SDNs between the source and destination, each controller along the route can determine the portions of the forwarding path autonomously simply by inspecting the tag value. We assume that all controllers along the route path have been advertising their encryptors.

A simple flow diagram for delivering an encrypted path via ENSERA is illustrated in FIG. 7. The process starts at step 700 when client 501 makes an encrypted path request. In step 701, the system determines if the user is authorized to make the request, and if authorized, is step 703, the request is entered into Encrypted Path Request Database 1010. Otherwise, an error is reported to client in step 702, and to the admin in step 703.

Once a proper request is in the database, in step 706, the system determines if it is the start-time of the request. If yes, in step 715, Encrypted Path Handling 1300 starts the process of path constructing and delivery. It first obtains the SDN topology from SDN Topology Database 1050 in step 749. It feeds the topology information into Route and Tag Determination 1200, to enable the path, which first checks in step 721, if there is already a live path established (for another encrypted flow) between the ingress and egress encryptors. If not, it proceeds with a new path determination. Otherwise, it will directly go to step 782 to configure controller with the known path and decryptor tag for the specific flow. In turn controller 1000 in step 790 configures SSES and other switches along the path.

In step 710, Route and Tag Determination 1200 checks to determine if there is a tag available for the decryptor. If it exists, then in step 740 it selects the appropriate tag corresponding to the requested SLA, and in step 782 sends the information to controller 1000. If a tag is not available, however, in step 742, it requests Encryptor Handing 1400 to request controller 100 to update (or acquire) the tag, which in turn triggers, in step 792, controller 100 to send a tag-update request to other controllers on east-west API.

Controller 1000 keeps the SDN Topology Database 1050 current in ENSERA, by updating reachability information it acquires from other controllers, and feeding this information periodically or as needed to ENSERA.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and icy not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable act discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

This invention provides a system and method for delivery of a dynamic and secure encrypted path between network nodes across SDNs, without bringing any further extensions to the current SDN communications protocols. By associating a global tag to each encryptor in the network, and by allowing controllers to advertise their respective encryptor information along with associated tag(s), each SDN can autonomously determine the route of an encrypted path and program their respective switches to perform a fast tag-based forwarding. A nearby network-based encryptor encrypts the packets originating from a source, while another network-based decryptor nearby the destination decrypts the packets and delivers them. Note that the controller may decide to reroute certain segments of the path in which case the flow can be seamlessly moved from one set of switches to another so long as the encryptors at the two ends remain the same. Multiple tags per encryptor can be exploited to signify paths with different SLAs.

The invention claimed is:

1. A method, as implemented in a first switch, to setup an encrypted path between a source and destination comprising:
   (a) receiving, at the first switch, one or more data packets from the source intended for destination, the first switch directly attached to a first encryptor;
   (b) tagging each data packet received in (a) with a unique tag corresponding to a second encryptor associated with the destination;
   (c) forwarding tagged data packets from (b) to the first encryptor wherein, for each packet, the first encryptor:
      (c1) removes the unique tag in each packet,
      (c2) encrypts layer-3 packet content and header,
      (c3) retags encrypted packets of (c2) with the unique tag corresponding to the second encryptor associated with the destination, and
      (c4) returns retagged, encrypted, packets of (c3) back to the first switch;
   (d) receiving retagged, encrypted, packets returned in (c4) and forwarding the same to a second switch directly attached to the second encryptor, wherein the second encryptor decrypts the forwarded retagged, encrypted, packets.

2. The method of claim 1, wherein the unique tag is inserted between the layer-2 and layer-3 packet headers.

3. The method of claim 1, wherein a plurality of routes are used between the first and second encryptors to meet flow-specific service level agreements (SLA).

4. The method of claim 1, wherein the source and destination are on the same software defined network (SDN).

5. The method of claim 1, wherein the source and destination are on different software defined networks (SDNs).

6. The method of claim 5, wherein each of the different SDNs have a plurality of encryptors, where the different SDNs advertise, to each other via an advertisement message, unique tags of encryptors associated with each of them.

7. The method of claim 6, wherein, prior to initiation of communication, cipher suites to be used are agreed upon for communication between different encryptors in the different SDNs.

8. The method of claim 6, wherein the advertisement message further includes an identification of a default encryptor for each corresponding SDN.

9. The method of claim 6, wherein when an unique tag received via an advertisement message is identified to be in use by another encryptor, a reply is sent in response to the advertisement message to notify a conflict and requesting a new unique tag that is not in use.

10. The method of claim 1, wherein the first encryptor encrypts layer-3 packet in (c2) using IPSec based on either symmetric or asymmetric ciphering.

11. The method of claim 1, wherein the unique tag is any of the following: a Multi-Protocol Label Switching (MPLS) tag, an IP address, a location code, or an unique identifier.

12. An article of manufacture comprising non-transitory computer storage medium storing computer readable program code which, when executed by a computer, implements a computer-based method, as implemented in a first switch, to setup an encrypted path between a source and destination comprising:
   (a) computer readable program code receiving, at the first switch, one or more data packets from the source intended for destination, the first switch directly attached to a first encryptor;
   (b) computer readable program code tagging each data packet received in (a) with a unique tag corresponding to a second encryptor associated with the destination;
   (c) computer readable program code forwarding tagged data packets from (b) to the first encryptor wherein, for each packet, the first encryptor:
      (c1) removes the unique tag in each packet,
      (c2) encrypts layer-3 packet content and header,
      (c3) retags encrypted packets of (c2) with the unique tag corresponding to the second encryptor associated with the destination, and
      (c4) returns retagged, encrypted, packets of (c3) back to the first switch;
   (d) computer readable program code receiving retagged, encrypted, packets returned in (c4) and forwarding the same to a second switch directly attached to the second encryptor, wherein the second encryptor decrypts the forwarded retagged, encrypted, packets.

13. The article of manufacture of claim 12, wherein the unique tag is inserted between the layer-2 and layer-3 packet headers.

14. The article of manufacture of claim 12, wherein a plurality of routes are used between the first and second encryptors to meet flow-specific service level agreements (SLA).

15. The article of manufacture of claim 12, wherein the source and destination are on the same software defined network (SDN).

16. The article of manufacture of claim 12, wherein the source and destination are on different software defined networks (SDNs).

17. The article of manufacture of claim 16, wherein each of the different SDNs have a plurality of encryptors, where the different SDNs advertise, to each other via an advertisement message, unique tags of encryptors associated with each of them.

18. The article of manufacture of claim 16, wherein, prior to initiation of communication, cipher suites to be used are agreed upon for communication between different encryptors in the different SDNs.

19. The article of manufacture of claim 16, wherein the advertisement message further includes an identification of a default encryptor for each corresponding SDN.

20. The article of manufacture of claim 16, wherein when a unique tag received via an advertisement message is identified to be in use by another encryptor, a reply is sent in response to the advertisement message to notify a conflict and requesting a new unique tag that is not in use.

21. The article of manufacture of claim 12, wherein the first encryptor encrypts layer-3 packet in (c2) using IPSec based on either symmetric or asymmetric ciphering.

22. The article of manufacture of claim 12, wherein the unique tag is any of the following: a Multi-Protocol Label Switching (MPLS) tag, an IP address, a location code, or an unique identifier.

* * * * *